United States Patent
Wang et al.

(10) Patent No.: US 9,651,832 B2
(45) Date of Patent: May 16, 2017

(54) LIQUID CRYSTAL DISPLAY (LCD) PANEL AND LCD DEVICE

(71) Applicant: BOE TECHNOLOGY GROUP CO., LTD., Beijing (CN)

(72) Inventors: Yingtao Wang, Beijing (CN); Jikai Yao, Beijing (CN); Jaegeon You, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 44 days.

(21) Appl. No.: 14/435,866

(22) PCT Filed: Aug. 20, 2014

(86) PCT No.: PCT/CN2014/084824
§ 371 (c)(1),
(2) Date: Apr. 15, 2015

(87) PCT Pub. No.: WO2015/161592
PCT Pub. Date: Oct. 29, 2015

(65) Prior Publication Data
US 2016/0048061 A1    Feb. 18, 2016

(30) Foreign Application Priority Data

Apr. 22, 2014 (CN) .......................... 2014 1 0163189

(51) Int. Cl.
*C09K 19/02* (2006.01)
*G02F 1/1343* (2006.01)
(Continued)

(52) U.S. Cl.
CPC .... *G02F 1/134309* (2013.01); *G02F 1/13439* (2013.01); *G02F 1/133345* (2013.01);
(Continued)

(58) Field of Classification Search
CPC ............. G02F 1/1343; G02F 1/133345; G02F 1/13439; G02F 1/134309; G02F 1/133528
(Continued)

(56) References Cited

U.S. PATENT DOCUMENTS 8,885,132 B2 * 11/2014 Morita .............. G02F 1/134309
349/129
9,291,865 B2 *  3/2016 Miyanaga ............. G02F 1/1345
(Continued)

FOREIGN PATENT DOCUMENTS

CN       1688920 A    10/2005
CN     202563217 U    11/2012
(Continued)

OTHER PUBLICATIONS

Jan. 26, 2015—International Search Report and the Written Opinion with Eng Tran.
(Continued)

*Primary Examiner* — Hoan C Nguyen
(74) *Attorney, Agent, or Firm* — Banner & Witcoff, Ltd.

(57) ABSTRACT

A liquid crystal display (LCD) panel and an LCD device are disclosed. The LCD panel comprises a plurality of pixel units. Each pixel unit includes an upper substrates, a lower substrate and a liquid crystal layer disposed between the upper substrate and the lower substrate. A first common electrode, an insulating layer and a pixel electrode are sequentially disposed on one side of the lower substrate facing the liquid crystal layer. The pixel electrode includes a plurality of first electrodes and second electrodes which have strip structures and are alternately distributed. A second common electrode is disposed on one side of the upper substrate facing the liquid crystal layer. The LCD panel can
(Continued)

improve the response speed of liquid crystal molecules and increase the transmittance of the liquid crystal layer when the pixel units are electrified.

18 Claims, 4 Drawing Sheets

(51) Int. Cl.
*G02F 1/1333* (2006.01)
*G02F 1/1335* (2006.01)

(52) U.S. Cl.
CPC ............... *G02F 1/133528* (2013.01); *G02F 2001/134318* (2013.01); *G02F 2001/134381* (2013.01)

(58) Field of Classification Search
USPC .................................................. 349/183–186
See application file for complete search history.

(56) References Cited

U.S. PATENT DOCUMENTS

2005/0168663 A1* 8/2005 Miyachi ................. G02F 1/137
349/24

2009/0091587 A1* 4/2009 Kim ................. G02F 1/134363
345/690
2014/0063387 A1* 3/2014 Gu .................... G02F 1/134309
349/33

FOREIGN PATENT DOCUMENTS

| CN | 103620483 A | 3/2014 |
| CN | 103969898 A | 8/2014 |
| CN | 203786441 U | 8/2014 |
| CN | 104049422 A | 9/2014 |
| JP | 2004354407 A | 12/2004 |
| KR | 20040100338 A | 12/2004 |
| WO | 2013058157 A1 | 4/2013 |

OTHER PUBLICATIONS

Jan. 27, 2016—(CN) Office Action App No. 201410163189.6.
Jul. 5, 2016—(CN)—Second Office Action Appn 201410163189.6 with English Tran.

* cited by examiner

LIQUID CRYSTAL DISPLAY (LCD) PANEL AND LCD DEVICE

The application is a U.S. National Phase Entry of International Application No. PCT/CN2014/084824 filed on Aug. 20, 2014, designating the United States of America and claiming priority to Chinese Patent Application No. 201410163189.6 filed on Apr. 22, 2014. The present application claims priority to and the benefit of the above-identified applications and the above-identified applications are incorporated by reference herein in their entirety.

TECHNICAL FIELD

At least one embodiment of the present invention relates to a liquid crystal display (LCD) panel and an LCD device.

BACKGROUND

With the rapid development of display technology, people have higher and higher requirement on the display effect of display images of LCD devices. For example, LCD panels in the LCD devices are required to have the advantages of high transmittance, rapid response and the like.

FIG. 1 is a schematic structural view of an LCD panel of an LCD device. As illustrated in FIG. 1, the LCD panel of the LCD device comprises a lower substrate 1, an upper substrate 2, a liquid crystal layer 3 disposed between the upper substrate 2 and the lower substrate 1, and electrode structures 4 formed between the lower substrate 1 and the liquid crystal layer 3. The electrode structure 4 includes an electrode 41, an electrode 42 and an electrode 43. The electrode 41 and the electrode 43 have strip structures; the electric potential of the electrode 41 is higher than that of the electrode 43; the electric potential of the electrode 42 is between the electric potential of the electrode 41 and the electric potential of the electrode 43; and the electrode 42 is a plate electrode.

SUMMARY

At least one embodiment of the present invention provides an LCD panel and an LCD device. The electric fields formed by electrode structures in the LCD panel enhance the electric field intensity in the horizontal direction on the upper substrate side, improve the response speed of the LCD panel, and meanwhile, increase the transmittance of the LCD panel in the case of display.

At least one embodiment of the present invention provides an LCD panel, which comprises a plurality of pixel units. Each pixel unit includes an upper substrate, a lower substrate and a liquid crystal layer disposed between the upper substrate and the lower substrate. A first common electrode, an insulating layer and a pixel electrode are sequentially disposed on one side of the lower substrate facing the liquid crystal layer; the pixel electrode includes a plurality of first electrodes and second electrodes which have strip structures and are alternately distributed; and a second common electrode is disposed on one side of the upper substrate facing the liquid crystal layer.

At least one embodiment of the present invention further provides an LCD device, which comprises the foregoing LCD panel.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 1:
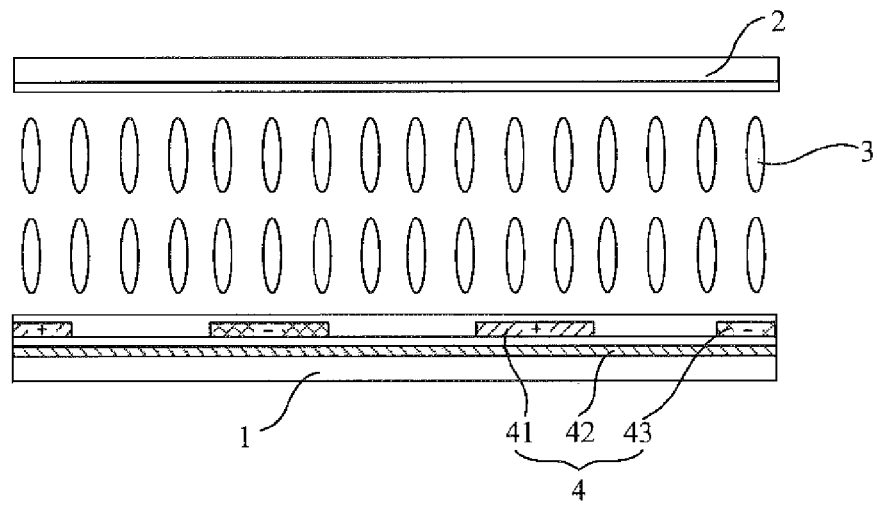
FIG. 1 is a schematic structural view of an LCD panel of an LCD device.

The inventors of the application have noted that: in the case of image display of the LCD panel as shown in FIG. 1, electric fields are formed by electrode structures 4, but as vertical electric field components account for a large proportion in the electric fields entering the liquid crystal layer 3, liquid crystal molecules in the liquid crystal layer 3 have low deformation in the horizontal direction, and hence the transmittance of the liquid crystal layer 3 can be undesirably affected. Therefore, an LCD panel and an LCD device are required to be provided to improve the response speed and the transmittance of the LCD panel.

Figure 2:
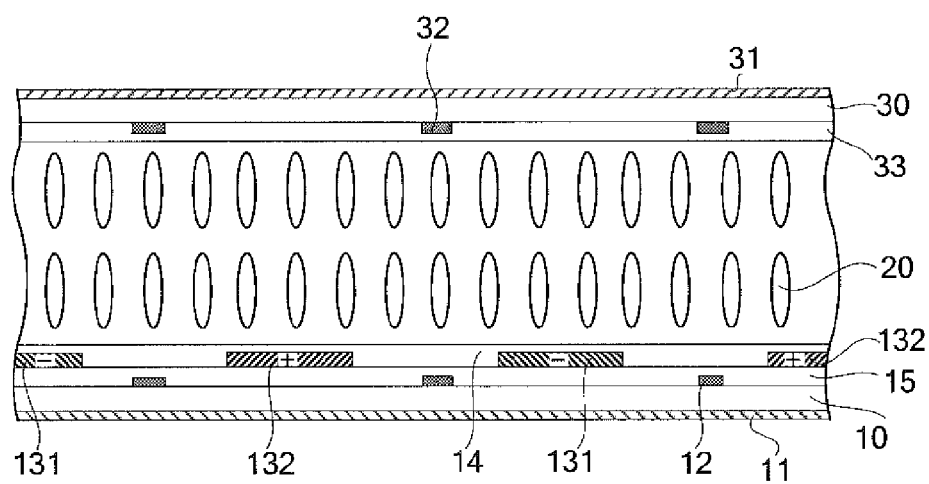
FIG. 2 is a schematic structural view of an LCD panel provided by an embodiment of the present invention.

FIG. 2 is a schematic structural view of an LCD panel provided by one embodiment of the present invention. The LCD panel provided by at least one embodiment of the present invention comprises a plurality of pixel units. Each pixel unit includes an upper substrate 30, a lower substrate 10 and a liquid crystal layer 20 disposed between the upper substrate 30 and the lower substrate 10. A first common electrode 12, an insulating layer 15 and a pixel electrode are sequentially disposed on one side of the lower substrate 10 facing the liquid crystal layer 20. The pixel electrode includes a plurality of first electrodes 131 and a plurality of second electrodes 132 which have strip structures and are alternately distributed. A second common electrode 32 is disposed on one side of the upper substrate 30 facing the liquid crystal layer 20.

In one example, an alignment layer 14 is disposed between the pixel electrode and the liquid crystal layer 20, and an alignment layer 33 is disposed between the second common electrode 32 and the liquid crystal layer.

In each pixel unit of the LCD panel provided by at least one embodiment of the present invention, a first common electrode 12 and a pixel electrode are disposed on the lower substrate 10; a second common electrode 32 is disposed on the upper substrate 30; the pixel electrode, the first common electrode 12 and the second common electrode 32 are combined to form an electrode structure of the LCD panel; and the pixel electrode disposed on the lower substrate 10 includes a plurality of first electrodes 131 and a plurality of second electrodes 132 which have strip structures and are alternately distributed.

With the simulation result analysis of the LCD simulation software Techwiz 2D, when the pixel unit is electrified, in the electrode structure of the pixel unit, an electric field is not only generated between the first electrodes 131 and the second electrodes 132 in the pixel electrode but also generated between the first electrodes 131 and the first common electrode 12, the first electrodes 131 and the second common electrode 32, the second electrodes 132 and the first common electrode 12, and the second electrodes 132 and the second common electrode 32. Therefore, the electric field intensity in the horizontal direction on the upper substrate side can be enhanced, so that liquid crystal molecules on the upper substrate side can be subjected to more adequate electric field action, and hence the transmittance of the LCD panel can be increased. In addition, the on-state response speed of the liquid crystal molecules is faster when the electric field intensity is larger. As the electrode structure can enhance the horizontal electric field intensity on the upper substrate side and the lower substrate side, the response speed of the LCD panel can be also greatly improved. Therefore, the LCD panel has higher transmittance in the case of display and faster response speed.

Figure 3A:
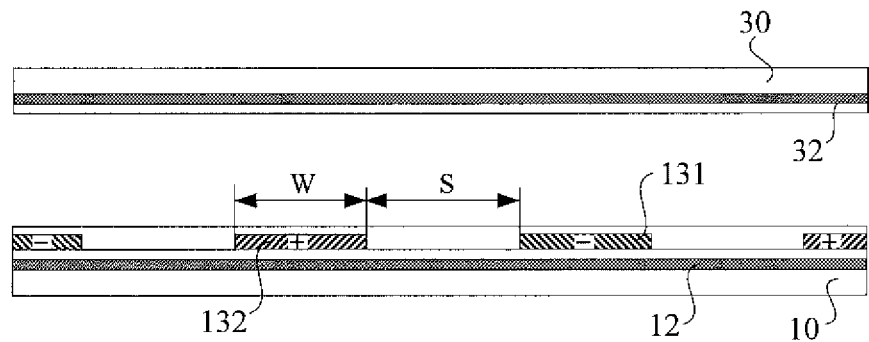
FIGS. 3a to 3c are schematic structural views of several arrangement modes of a first common electrode and a second common electrode in the LCD panel provided by an embodiment of the present invention.
Figure 3B:
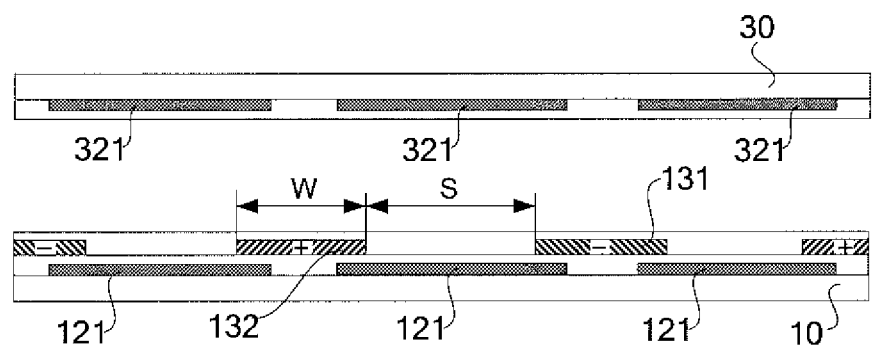

As illustrated in FIG. 3b, in one embodiment, in order to increase the uniformity of the electric fields formed among the first electrodes 131, the second electrodes 132, the first common electrode 12 and the second common electrode 32, in the pixel electrode, the first electrodes 131 have a same width; the width W of each second electrode 132 is the same as the width of the first electrode 131; a gap is formed between the first electrodes 131 and the second electrodes 132 adjacent to each other; and the width S of the gaps is the same as each other.

In one embodiment, when the electrode structure of the pixel unit is electrified, the first common electrode 12 and the second common electrode 32 are at a same electric potential; and the electric potential difference between the first electrodes 131 and the first common electrode 12 is the same as the electric potential difference between the first common electrode 12 and the second electrodes 132.

In the LCD panel provided by the embodiment, the arrangement mode of the first common electrode 12 and the second common electrode 32 may be multiple.

Mode 1: as illustrated in FIG. 3a, both the first common electrode 12 and the second common electrode 32 may be a plate electrode.

Figure 3C:
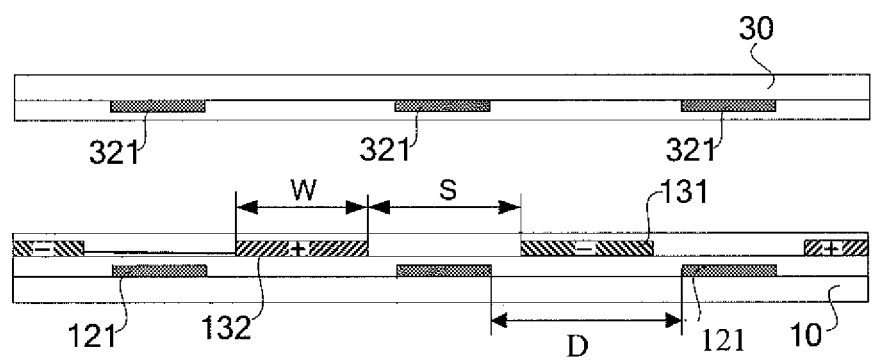

Mode 2: as illustrated in FIGS. 3b and 3c, the first common electrode 12 may include a plurality of first strip electrodes 121 in one-to-one correspondence with the gaps between the plurality of first electrodes 131 and the plurality of second electrodes 132, and the width D between the first strip electrodes 121 is same; the second common electrode 32 may include second strip electrodes 321 in one-to-one correspondence with the plurality of first strip electrodes 121; and the width of each second strip electrode 321 is the same as the width of the first strip electrode 121. For instance, in each pair of first strip electrode 121 and second strip electrode 321, in the direction perpendicular to the lower substrate 10, a centerline of the first strip electrode 121 coincides with a centerline of the second strip electrode 321, and a centerline of a gap between the first strip electrodes 121 coincides with a centerline of a gap between corresponding second strip electrodes 321.

Mode 3: one of the first common electrode 12 and the second common electrode 32 is a plate electrode, and the other includes a plurality of strip electrodes arranged in parallel to each other. The strip electrodes are, for instance, in one-to-one correspondence with the gaps between the plurality of first electrodes 131 and the plurality of second electrodes 132, and the width between the first strip electrodes is the same.

In one embodiment, the parameters of liquid crystal molecules in the liquid crystal layer 20 of the LCD panel are as follows: K11=13.3 pN; K22=9.5 pN; K33=19.9 pN; ∈∥=19 F/m; ∈⊥=2 F/m; γ=200 m Pa s; Ne=1.61266; No=1.485; the cell gap of the liquid crystal layer is 3.6 μm; and the pre-tilt angle of liquid crystal molecules on the upper substrate side and the lower substrate side is 90°. K11, K22, K33 are the elastic constant of the liquid crystal and mainly have the function of restoring the liquid crystal to the initial state; ∈∥ and ∈⊥ are the dielectric constant of the liquid crystal and determine the size of the driving voltage; γ is the viscosity coefficient of the liquid crystal and determines the response speed of the liquid crystal; Ne and No are the refractive index of the liquid crystal in two directions; and the difference between Ne and No affects the cell gap of the liquid crystal cell.

In one embodiment, as illustrated in FIG. 2, an upper polarizer 31 is disposed on one side of the upper substrate 30 away from the lower substrate 10; a lower polarizer 11 is disposed on one side of the lower substrate 10 away from the upper substrate 30; an optical axis of the upper polarizer 31 is perpendicular to an optical axis of the lower polarizer 11; and an angle of 45° is formed between an optical axis of the upper substrate 30 and the longitudinal direction of the first electrode 131. The formula of the transmittance is:

$$T = \sin^2(2\chi)\sin^2\left(\frac{\pi \Delta nd}{\lambda}\right).$$

In the formula, an included angle between the optical axis of the polarizer and the direction of liquid crystal directors arranged along the surface (or the plane along which vertical alignment (VA) mode liquid crystal molecules fall) is x, and the maximum value can be obtained when x is 45°. Therefore, in the embodiment, when the liquid crystal molecules are subjected to electric field action, the liquid crystal molecules may be arranged along the direction having an included angle of 45° with the polarizer, and hence the LCD panel can have higher transmittance.

On the basis of the embodiment, in the electrode structure:

The width of each first electrode 131 may be 2 to 6 μm, e.g., 2 μm, 2.2 μm, 2.5 μm, 3 μm, 3.5 μm, 4 μm, 4.5 μm, 4.7 μm, 5 μm, 5.5 μm, 5.7 μm and 6 μm.

The width S of the gap between any first electrode 131 and any second electrode 132 adjacent to each other may be 2 to 12 μm, e.g., 2 μm, 2.2 μm, 3.5 μm, 5 μm, 6.5 μm, 7 μm, 8 μm, 8.5 μm, 9 μm, 10 μm, 11 μm and 12 μm.

The width of each first strip electrode 121 is 1 to 12 µm, e.g., 1 µm, 1.6 µm, 2 µm, 2.2 µm, 3.5 µm, 5 µm, 6.5 µm, 7 µm, 8 µm, 8.5 µm, 9 µm, 10 µm, 11 µm, 11.5 µm and 12 µm.

Figure 4A:
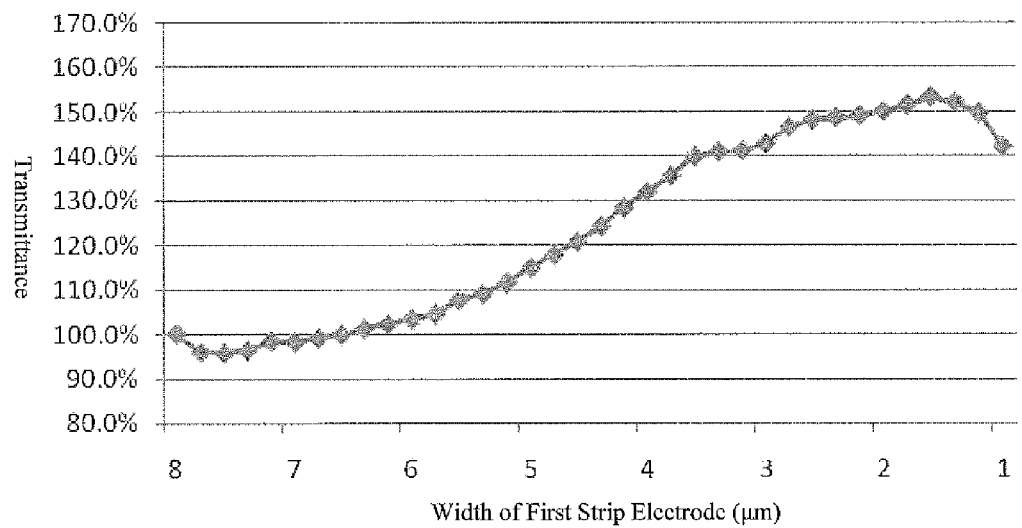
FIG. 4a is a schematic diagram illustrating the relationship between the transmittance of the LCD panel and the width of a first strip electrode in the LCD panel provided by an embodiment of the present invention.
Figure 4B:
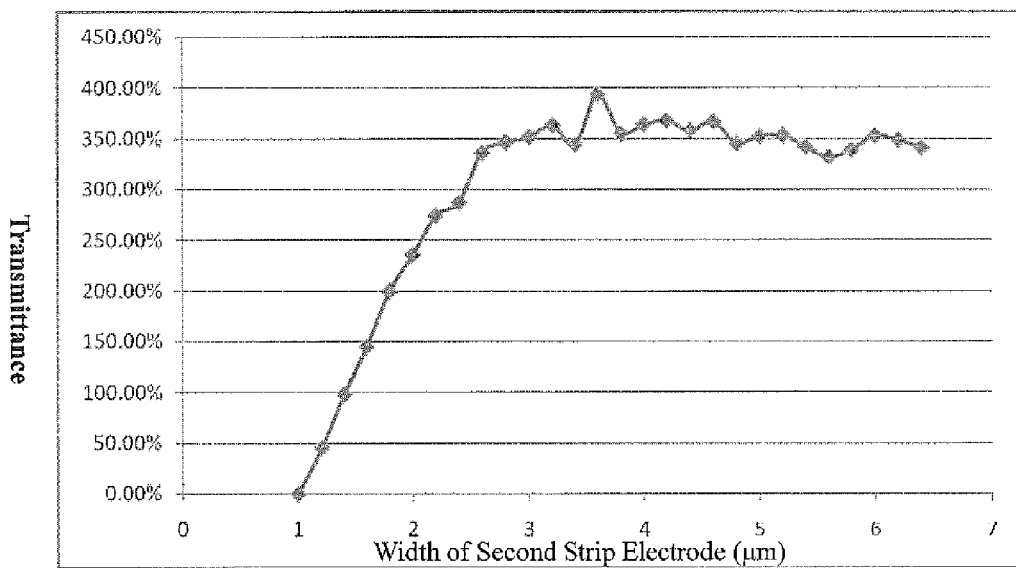
FIG. 4b is a schematic diagram illustrating the relationship between the transmittance of the LCD panel and the width of a second strip electrode in the LCD panel provided by an embodiment of the present invention.

In one embodiment, the width of each first electrode 131 is 3 µm; the width of the second electrode 132 is 3 µm; the width of the gap between any first electrode 131 and any second electrode 132 adjacent to each other is 5 µm; and the width of each first strip electrode 121 is 1.6 µm. In one embodiment, the width of the first strip electrode 121 is 1.6 µm, and the width of the second strip electrode 321 is 3.2 µm. When the electric potential of the first electrodes 131 is −4.2V, the electric potential of the second electrodes 132 is +4.2V, and the electric potential of the first common electrode 12 and the second common electrode 32 is 0V, the response speed of the LCD panel is the fastest. FIGS. 4a and 4b respectively illustrate the relationship between the transmittance of the LCD panel and the width of the first strip electrodes 121 and the relationship between the transmittance of the LCD panel and the width of the second strip electrodes 321. FIG. 4b is obtained by the simulation of the second strip electrodes 321 with different widths on the basis of the width of 1.6 µm of the first strip electrodes 121. Supposing the transmittance of the LCD panel having the electrode structure as shown in FIG. 1 is one hundred percent and other parameters are the same, as seen from FIGS. 4a and 4b, in the pixel structure in one embodiment of the present invention, when the width of the first strip electrodes 121 is 1.6 µm and the width of the second strip electrodes 321 is 3.2 µm, the transmittance of the LCD panel provided by the embodiment of the present invention in the case of display may be maximum and is greater than the transmittance of the LCD panel having the electrode structure as shown in FIG. 1.

Figure 5:
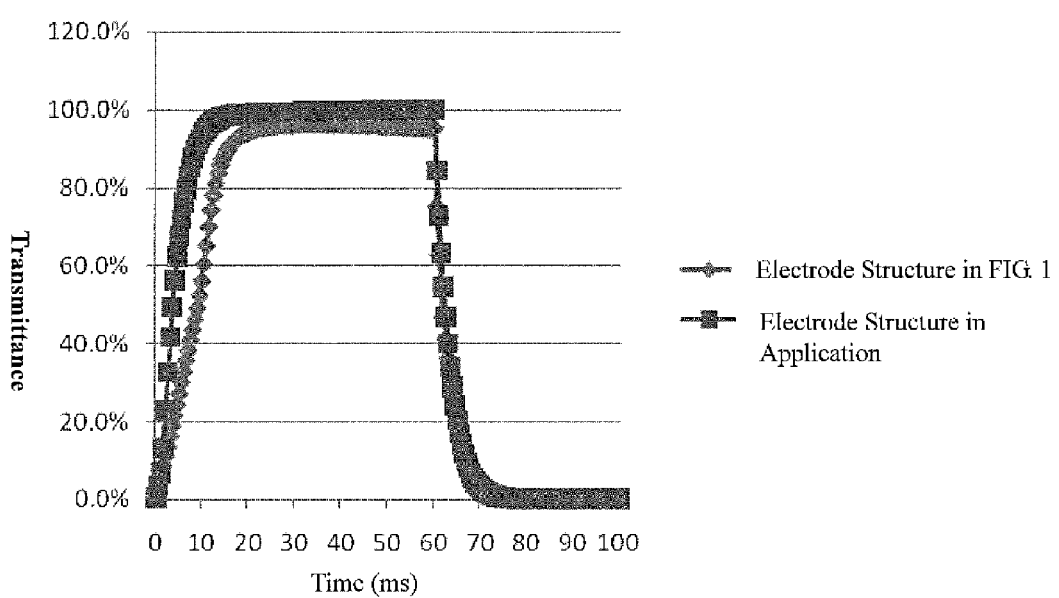
FIG. 5 is a comparison chart of the response time of the LCD panel provided by an embodiment of the present invention and the response time of the LCD panel as shown in FIG. 1.

Of course, as illustrated in FIG. 5, as for the LCD panel having the electrode structure as shown in FIG. 1, in the response time period, the rising-side time of the LCD panel is 12.6 ms and the falling-side time is 7.4 ms; but in the LCD panel having the electrode structure provided by the embodiment of the present invention, in the simulation result of the LCD simulation software Techwiz 2D, in the response time period, the rising-side time of the LCD panel is 7.4 ms and the falling-side time is 6.6 ms. There is the fall of 6 ms compared with the LCD panel having the electrode structure as shown in FIG. 1. Therefore, the response time period of the LCD panel provided by the embodiment of the present invention is relatively short.

In addition, at least one embodiment of the present invention further provides an LCD device, which comprises any foregoing LCD panel. The LCD device may be: any product or component with display function such as an LCD panel, a mobile phone, a tablet PC, a TV, a display, a notebook computer, a digital picture frame and a navigator.

Obviously, various changes and modifications can be made to the embodiments of the present invention by those skilled in the art without departing from the spirit and scope of the present invention. Therefore, if the changes and modifications of the present invention fall within the scope of the appended claims of the present invention and equivalents thereof, the present invention is also intended to include the changes and modifications.

The application claims priority to the Chinese patent application No. 201410163189.6 submitted on Apr. 22, 2014. The disclosure content of the Chinese patent application is incorporated by reference herein as part of the application.

The invention claimed is:

1. A liquid crystal display (LCD) panel, comprising a plurality of pixel units, each pixel unit including an upper substrate, a lower substrate and a liquid crystal layer disposed between the upper substrate and the lower substrate,
wherein parameters of liquid crystal molecules in the liquid crystal layer are as follows:
K11=13.3 pN; K22=9.5 pN; K33=19.9 pN; $\in_\parallel$=19 F/m; $\in_\perp$=2 F/m; γ=200 m Pa s; Ne=1.61266; No=1.485, wherein each of K11, K22, K33 represents an elastic constant of the liquid crystal molecules; $\in_\parallel$ and $\in_\perp$ are dielectric constants of the liquid crystal molecules; γ is a viscosity coefficient of the liquid crystal molecules; Ne and No are refractive indexes of the liquid crystal molecules in two directions; and
a cell gap of the liquid crystal layer is 3.6 µm; and a pre-tilt angle of liquid crystal molecules on the upper substrate and the lower substrate is respectively 90°;
wherein
a first common electrode, an insulating layer and a pixel electrode are sequentially disposed on one side of the lower substrate facing the liquid crystal layer; the pixel electrode includes a plurality of first electrodes and second electrodes which have strip structures and are alternately distributed; and a second common electrode is disposed on one side of the upper substrate facing the liquid crystal layer.

2. The LCD panel according to claim 1, wherein the first electrodes have a same width; a width of each second electrode is the same as that of the first electrode; gaps are formed between the first electrodes and the second electrode adjacent to each other; and the gaps have a same width.

3. The LCD panel according to claim 1, wherein the first common electrode and the second common electrode are at a same electric potential; and an electric potential difference between the first electrodes and the first common electrode is the same as an electric potential difference between the first common electrode and the second electrodes.

4. The LCD panel according to claim 1, wherein the first common electrode is a plate electrode; and the second common electrode is a plate electrode.

5. The LCD panel according to claim 1, wherein the first common electrode includes a plurality of first strip electrodes in one-to-one correspondence with gaps between the plurality of first electrodes and the plurality of second electrodes; and the first strip electrodes have a same width.

6. The LCD panel according to claim 5, wherein the second common electrode includes a plurality of second strip electrodes in one-to-one correspondence with the plurality of first strip electrodes; and a width of each second strip electrode is the same as that of the first strip electrode.

7. The LCD panel according to claim 6, wherein in each pair of first strip electrode and second strip electrode in a direction perpendicular to the lower substrate, a centerline of the first strip electrode coincides with a centerline of the second strip electrode, and a centerline of a gap between first strip electrodes coincides with a centerline of a gap between corresponding second strip electrodes.

8. The LCD panel according to claim 1, wherein an upper polarizer is disposed on one side of the upper substrate away from the lower substrate; a lower polarizer is disposed on one side of the lower substrate away from the upper substrate; and an optical axis of the upper polarizer is perpendicular to an optical axis of the lower polarizer.

9. The LCD panel according to claim 1, wherein a width of each first electrode is 2 to 6 µm; a width of a gap between any first electrode and any second electrode adjacent to each other is 2 to 12 µm; and a width of each first strip electrode is 1 to 12 µm.

10. The LCD panel according to claim 9, wherein the width of each first electrode is 3 µm; the width of the gap between any first electrode and any second electrode adjacent to each other is 5 µm; and the width of each first strip electrode is 1.6 µm.

11. A liquid crystal display device comprising the liquid crystal display panel according to claim 1.

12. The LCD panel according to claim 2, wherein the first common electrode and the second common electrode are at a same electric potential; and an electric potential difference between the first electrodes and the first common electrode is the same as an electric potential difference between the first common electrode and the second electrodes.

13. The LCD panel according to claim 2, wherein the first common electrode includes a plurality of first strip electrodes in one-to-one correspondence with the gaps between the plurality of first electrodes and the plurality of second electrodes; and the first strip electrodes have a same width.

14. The LCD panel according to claim 13, wherein the second common electrode includes a plurality of second strip electrodes in one-to-one correspondence with the plurality of first strip electrodes; and a width of each second strip electrode is the same as that of the first strip electrode.

15. The LCD panel according to claim 14, wherein in each pair of first strip electrode and second strip electrode in a direction perpendicular to the lower substrate, a centerline of the first strip electrode coincides with a centerline of the second strip electrode, and a centerline of a gap between first strip electrodes coincides with a centerline of a gap between corresponding second strip electrodes.

16. The LCD panel according to claim 5, wherein an upper polarizer is disposed on one side of the upper substrate away from the lower substrate; a lower polarizer is disposed on one side of the lower substrate away from the upper substrate; and an optical axis of the upper polarizer is perpendicular to an optical axis of the lower polarizer.

17. The LCD panel according to claim 5, wherein a width of each first electrode is 2 to 6 µm; a width of a gap between any first electrode and any second electrode adjacent to each other is 2 to 12 µm; and a width of each first strip electrode is 1 to 12 µm.

18. The LCD panel according to claim 17, wherein the width of each first electrode is 3 µm; the width of the gap between any first electrode and any second electrode adjacent to each other is 5 µm; and the width of each first strip electrode is 1.6 µm.

* * * * *